US011627385B2

(12) United States Patent
Sugii et al.

(10) Patent No.: US 11,627,385 B2
(45) Date of Patent: Apr. 11, 2023

(54) IMAGE CAPTURING APPARATUS

(71) Applicant: EIZO Corporation, Hakusan (JP)

(72) Inventors: Nobuaki Sugii, Kobe (JP); Takuya Katayama, Kobe (JP)

(73) Assignee: EIZO Corporation, Hakusan (JP)

(*) Notice: Subject to any disclaimer, the term of this patent is extended or adjusted under 35 U.S.C. 154(b) by 12 days.

(21) Appl. No.: 16/962,297

(22) PCT Filed: Jan. 30, 2019

(86) PCT No.: PCT/JP2019/003107
§ 371 (c)(1),
(2) Date: Jul. 15, 2020

(87) PCT Pub. No.: WO2019/151303
PCT Pub. Date: Aug. 8, 2019

(65) Prior Publication Data
US 2020/0374431 A1 Nov. 26, 2020

(30) Foreign Application Priority Data
Feb. 5, 2018 (JP) .............................. JP2018-018332

(51) Int. Cl.
*H04N 23/56* (2023.01)
*H04N 23/54* (2023.01)
(Continued)

(52) U.S. Cl.
CPC ............. *H04N 23/56* (2023.01); *G03B 15/02* (2013.01); *G03B 15/05* (2013.01); *H04N 23/54* (2023.01);
(Continued)

(58) Field of Classification Search
CPC .... H04N 5/2253; H04N 5/2256; H04N 5/247; G03B 15/02; G03B 15/05; G03B 15/06;
(Continued)

(56) References Cited

U.S. PATENT DOCUMENTS 5,778,258 A 7/1998 Zamoyski
6,106,124 A 8/2000 Tarsia
(Continued)

FOREIGN PATENT DOCUMENTS

AT 517570 A1 2/2017
CN 104847136 A 8/2015
(Continued)

OTHER PUBLICATIONS

International Search Report dated Mar. 5, 2019 in corresponding International Application No. PCT/JP2019/003107; 4 pages.
(Continued)

*Primary Examiner* — Daniel M Pasiewicz
(74) *Attorney, Agent, or Firm* — Maier & Maier, PLLC

(57) ABSTRACT

Provided is an image capturing apparatus with which images of a subject can be captured in diverse lighting environments that can be varied without moving the fixed positions of lighting fixtures. An image capturing apparatus 100 is provided with: a turntable 11 for placing a subject to be captured; cameras 6a and 6b for capturing images of the subject placed on a placement stand 1; a plurality of side walls 7a-7h provided to surround the turntable 11; and a plurality of lateral lighting units installed inside the plurality of side walls 7a-7h. In the image capturing apparatus 100, the lighting condition of the turntable 11 can be varied by individually changing the illumination states of the plurality of lateral lighting units.

18 Claims, 15 Drawing Sheets

(51) Int. Cl.
*H04N 23/90* (2023.01)
*G03B 15/02* (2021.01)
*G03B 15/05* (2021.01)

(52) U.S. Cl.
CPC ..... *H04N 23/90* (2023.01); *G03B 2215/0521* (2013.01); *G03B 2215/0567* (2013.01)

(58) Field of Classification Search
CPC ............ G03B 15/07; G03B 2215/0521; G03B 2215/0567; F16M 11/08; F16M 11/18
See application file for complete search history.

(56) References Cited

U.S. PATENT DOCUMENTS

| | | | |
|---|---|---|---|
| 8,462,206 B1* | 6/2013 | McGuire | G03B 15/07 348/135 |
| 9,429,817 B1 | 8/2016 | Harder et al. | |
| 10,386,184 B2* | 8/2019 | Hart | H04N 13/243 |
| 2002/0149927 A1 | 10/2002 | Westhofen | |
| 2011/0279063 A1 | 11/2011 | Wang et al. | |
| 2011/0310242 A1* | 12/2011 | Knupfer | G01N 21/9515 348/92 |
| 2016/0156829 A1 | 6/2016 | Takamori et al. | |
| 2016/0291446 A1 | 10/2016 | Lai | |
| 2018/0077875 A1* | 3/2018 | Vander Velden | A01G 7/00 |
| 2020/0201165 A1* | 6/2020 | Lock | H04N 5/23238 |

FOREIGN PATENT DOCUMENTS

| | | |
|---|---|---|
| CN | 105259730 A | 1/2016 |
| JP | 2003-032518 A | 1/2003 |
| JP | 2004535656 A | 11/2004 |
| JP | 2005055546 A | 3/2005 |
| JP | 2012239200 A | 12/2012 |
| JP | 2014-178957 A | 9/2014 |
| JP | 2016-103789 A | 6/2016 |
| JP | 2016-224170 A | 12/2016 |
| KR | 101653201 B1 | 9/2016 |

OTHER PUBLICATIONS

Japanese Office Action dated Jun. 10, 2020 in corresponding Japanese Application No. 2018-018332; 8 pages.

Office Action dated Nov. 2, 2021, in connection with corresponding German Application No. 11 2019 000 665.7 (10 pp., including machine-generated English translation).

Office Action dated Apr. 20, 2022, in connection with corresponding German Application No. 112019000665.7 (12 pp., including machine-generated English translation).

Japanese Office Action dated Nov. 1, 2021, in connection with corresponding Japanese Application No. 2020-182175 (4 pp., including machine-generated English translation).

* cited by examiner

IMAGE CAPTURING APPARATUS

TECHNICAL FIELD

The present invention relates to an image capturing apparatus used for capturing an image with various lighting conditions.

BACKGROUND ART

In recent years, system development using AI (Artificial Intelligence) has advanced in various fields. When creating an AI, it is necessary to make the AI read and learn a large amount of learning data. For example, the following Patent Document 1 discloses a learning data generation device for collecting a large number of object images as learning data for performing object detection and object identification from moving images and still images.

The Patent Document 1 discloses a photographing environment using a rotating table for photographing an object from various directions. It also discloses that, in order to change a lighting condition, various kinds of lightings are used, height of a stand fixing the lightings is changed stepwise, and position of the stand is moved. It also discloses that the height of the stand on which a camera is fixed is changed stepwise so that the object is photographed from various heights.

PRIOR ART DOCUMENT

Patent Document

Patent Document 1: JP2014-178957A

SUMMARY OF THE INVENTION

Problems to be Solved by the Invention

However, the configuration disclosed in the above Patent Document 1 requires a mechanical structure and a control mechanism for changing the height of the stand for fixing the lightings and the camera. Also, due to the addition of the process of moving the fixed position of the lighting, it takes considerable amount of time to photograph the images, especially a large number of images.

An object of the present invention is to provide an image capturing apparatus capable of capturing an image of a subject by changing the lighting environment in various ways without moving fixed position of a lighting.

Means for Solving the Problems

In order to solve the above problems, an image capturing apparatus according to the present invention includes a placement stand for placing a subject to be captured, at least one camera for capturing an image of the subject placed on the placement stand, a plurality of side walls provided to surround the placement stand, a plurality of lateral lighting units installed on inner surfaces of the plurality of side walls, in which a lighting condition of the placement stand can be varied by individually changing lighting states of the plurality of lateral lighting units.

Effect of the Invention

According to the above configuration, it is possible to provide the image capturing apparatus capable of capturing the image of the subject by changing lighting environment in various ways without moving fixed position of the lighting.

DESCRIPTION OF EMBODIMENTS

Figure 1:
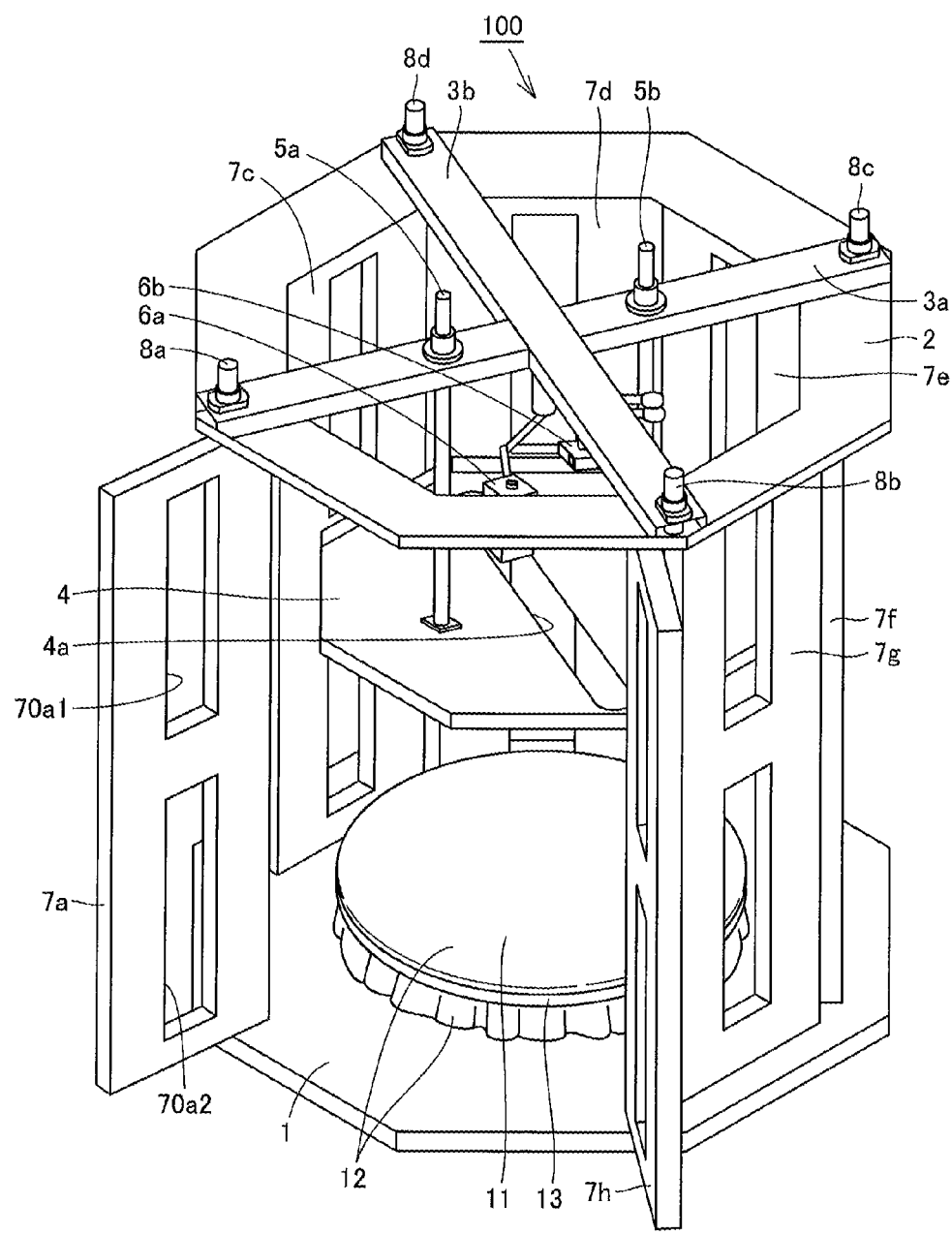
FIG. 1 is a perspective view showing a schematic configuration of an image capturing apparatus according to an embodiment.

An image capturing apparatus according to the first configuration of the present invention includes a placement stand for placing a subject to be captured, at least one camera for capturing an image of the subject placed on the placement stand, a plurality of side walls provided to surround the placement stand, and a plurality of lateral lighting units installed on inner surfaces of the plurality of side walls, in which a lighting condition of the placement stand is varied by individually changing lighting states of the plurality of lateral lighting units.

According to the first configuration, the lighting condition of the placement stand is varied by individually changing the lighting states of the plurality of lateral lighting units installed on the inner surfaces of the plurality of side walls provided to surround the placement stand.

In such way, it becomes easy to capture a large number of images with different light incident directions on one subject by varying the lighting conditions from the lateral direction. This is very convenient especially when capturing an image of a metal product or the like of which reflection state largely changes depending on the incident direction of light.

The second configuration is the image capturing apparatus of the first configuration, in which at least one of the side walls can be opened and closed.

According to the second configuration, since at least one of the side walls can be opened and closed, it is easy to attach the lateral lighting units to the inner surfaces of the side walls or remove the lateral lighting units from the inner surfaces of the side walls. Further, the subject to be captured can be easily placed on the placement stand or removed from the placement stand.

The third configuration is the image capturing apparatus of the first or second configuration further including an upper lighting plate having a plurality of upper lighting units above the placement stand, in which the lighting condition of the placement stand are varied by individually changing the lighting states of the plurality of upper lighting units.

According to the third configuration, the lighting condition above the placement stand can be varied by individually changing the lighting states of the plurality of upper lighting units of the upper lighting plate above the placement stand. Thereby, in addition to the change of the lighting conditions from the lateral direction, variation of the lighting conditions from the above can be increased.

The fourth configuration is the image capturing apparatus of the third configuration, in which the upper lighting plate is movable up and down.

According to the fourth configuration, it is possible to set various distances between the placement stand and the upper lighting plate, and thus to further increase the variations in the lighting conditions from the above.

The fifth configuration is the image capturing apparatus of the third or fourth configuration, in which the camera is arranged so as to face the placement stand through an opening of the upper lighting plate.

According to the fifth configuration, by providing the opening in the upper lighting plate, the camera can be installed above the upper lighting plate.

The sixth configuration is the image capturing apparatus of the fifth configuration, in which the camera is movable along the opening.

According to the sixth configuration, it is possible to capture the image with different capturing angles by changing the position of the camera along the opening of the upper lighting plate.

The seventh configuration is the image capturing apparatus of the fifth or sixth configuration, in which an angle of the camera can be changed with respect to a normal line of the upper lighting plate.

According to the seventh configuration, since the angle of the camera can be changed with respect to the normal line of the upper lighting plate, it is possible to capture the image with different capturing angles.

The eighth configuration is the image capturing apparatus according to any one of the first to seventh configurations, in which the at least one camera includes two or more cameras.

According to the eighth configuration, a large number of images can be captured efficiently by using the two or more cameras.

The ninth configuration is the image capturing apparatus according to any one of the first to eighth configurations, in which the lighting unit includes wiring substrates arranged in parallel and a light emitting element substrate connected between the wiring substrates, and the side wall has a rack supporting the lateral lighting unit.

According to the ninth configuration, the lateral lighting unit can be attached to the side wall by a simple process.

The tenth configuration is the image capturing apparatus according to the first configuration, in which each of the plurality of lateral lighting units includes a plurality of LED light emitting elements, and the lighting condition of the placement stand is varied by changing at least one of position, number, emission order, emission light intensity, and emission light color of the LED light emitting elements that emit light among the plurality of LED light emitting elements.

According to the tenth configuration, it is possible to realize many variations of the lighting conditions of the placement stand by using the plurality of LED light emitting elements of the lateral lighting unit.

The eleventh configuration is the image capturing apparatus of the third configuration, in which each of the plurality of upper lighting units includes a plurality of LED light emitting elements, and the lighting condition of the placement stand is varied by changing at least one of position, number, emission order, emission light intensity, and emission light color of the LED light emitting elements that emit light among the plurality of LED light emitting elements.

According to the eleventh configuration, it is possible to realize many variations of lighting conditions of the placement stand by using the plurality of LED light emitting elements of the upper lighting unit.

The twelfth configuration is the image capturing apparatus according to any one of the first to eleventh configurations, in which the placement stand includes a turntable.

According to the twelfth configuration, it is possible to change a capturing direction for the subject to be captured in various ways by rotating the turntable on which the subject to be captured is placed.

Embodiments

Hereinafter, specific embodiments of the present invention will be described in detail with reference to the drawings. The same or corresponding portions in the drawings are designated by the same reference numerals and description thereof will not be repeated. In the drawings referred to below, the configurations are shown in a simplified or schematic manner, or some of constituent members are omitted in order to make the description clear. Further, dimensional ratios between the constituent members shown in each drawing do not necessarily show actual dimensional ratios.

First, a schematic configuration of an image capturing apparatus 100 according to an embodiment of the present invention will be described with reference to FIGS. 1 to 4. FIG. 1 is a perspective view showing the schematic configuration of the image capturing apparatus 100. In FIGS. 1 to 4, a lighting unit provided inside the image capturing apparatus 100 is not shown. The lighting unit will be described separately with reference to FIG. 5 and subsequent figures.

Figure 2:
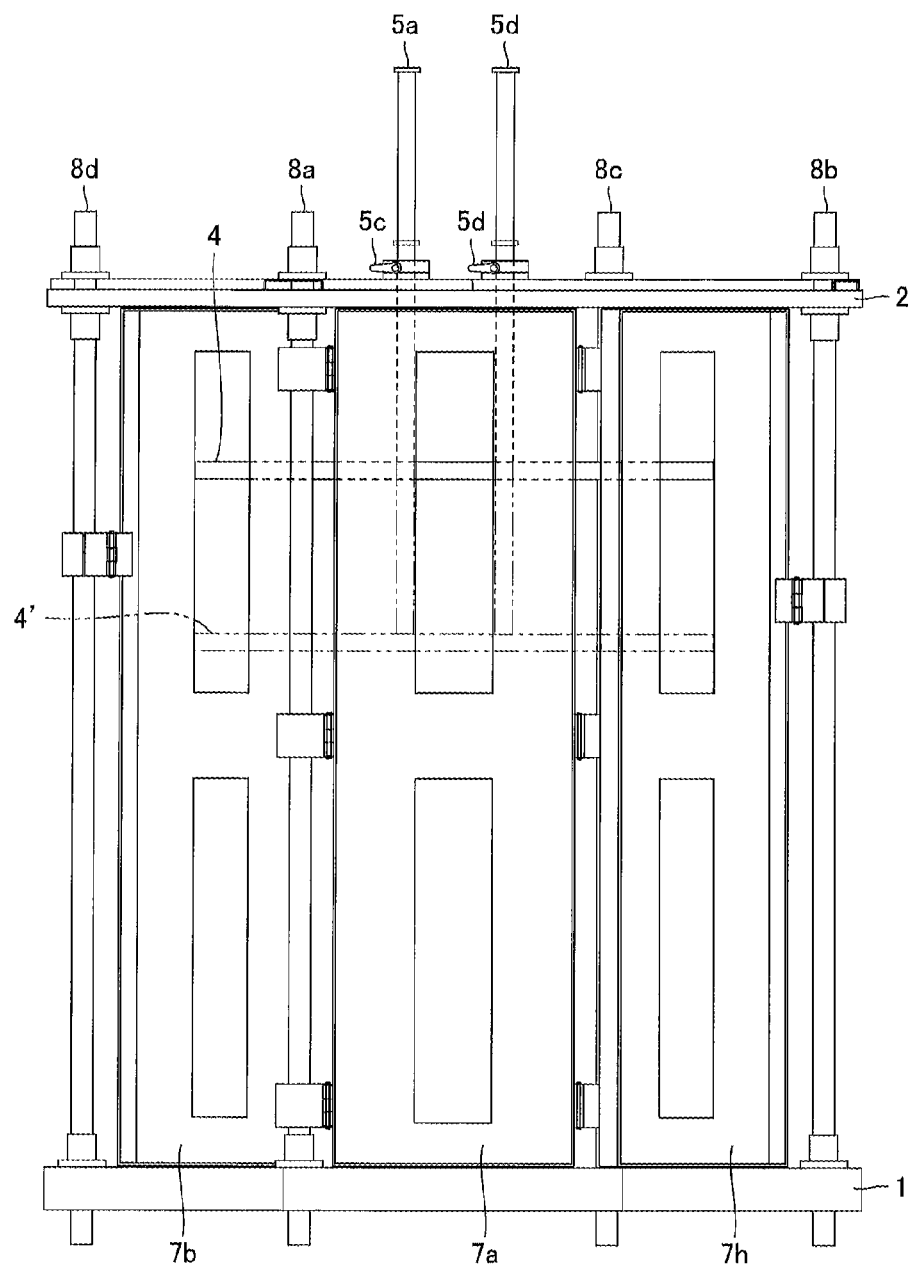
FIG. 2 is a side view of the image capturing apparatus.

The image capturing apparatus 100 includes a bottom plate 1 as shown in FIGS. 1 and 2. In the present embodiment, the bottom plate 1 has a regular octagonal planar shape. The bottom plate 1 can be formed of any material such as metal and resin. A disc-shaped turntable 11 is provided on the bottom plate 1. A surface of the turntable 11 is covered with a cloth 12. The cloth 12 is fixed to the turntable 11 with a cloth fixing ring 13 attached along the side surface of the turntable 11. A subject to be captured is placed on the cloth 12. Color and material of the cloth 12 may be appropriately selected for the purpose of highlighting a contour of the subject to be captured, matching circumstances and conditions during use, and the like. The turntable 11 is configured to rotate around its center. Although not shown here, the turntable 11 is configured to be rotationally driven at a constant angular velocity by a motor or the like. With the configuration in which the bottom plate 1 is rotated in this manner, the capturing can be performed in various ways of lighting the subject to be captured.

Figure 3:
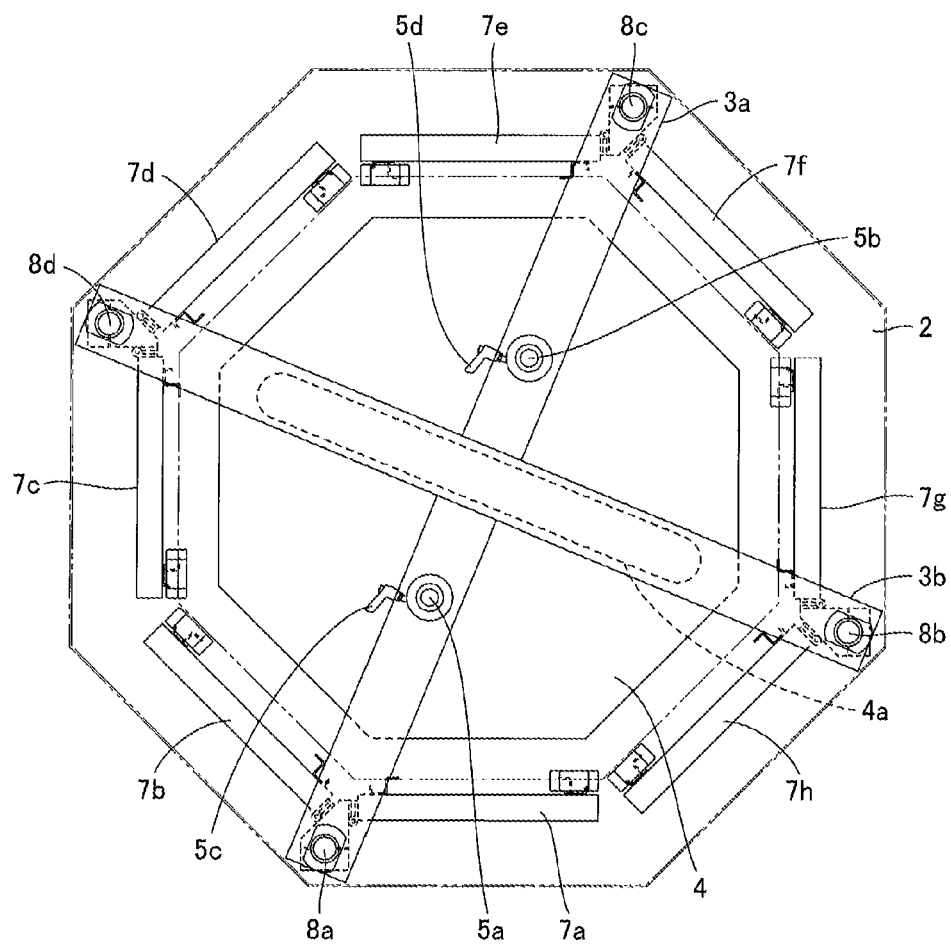
FIG. 3 is a top view of the image capturing apparatus.

Each of columns 8a to 8d is attached to a corner of the regular octagonal bottom plate 1 at intervals of one corner thereof, that is, at four corners of the bottom plate 1. The columns 8a to 8d support a top plate 2 having substantially the same outer shape as the bottom plate 1. Two doors 7 are attached to each of the columns 8a to 8d. That is, the image capturing apparatus 100 includes eight doors 7a to 7h. As shown in FIG. 3, the doors 7a to 7h are arranged along eight respective sides of the bottom plate 1 and the top plate 2.

The door 7a has an upper window 70a1 and a lower window 70a2. Similarly, the doors 7b to 7h have the windows. The upper window 70a1 and lower window 70a2 may be simple openings or may have transparent glass or the like. In the present embodiment, two windows, the upper window 70a1 and lower window 70a2, are provided, but the number of windows may be one, or three or more. Alternatively, the door may have no window. It is not necessary to provide the windows on all the doors. However, when the windows are provided, it is preferable that positions, shapes, and sizes of the windows in the eight doors are symmetrical in order to make a lighting condition uniform. By providing the windows, there is an advantage that weight of the entire apparatus can be reduced. If necessary, a camera may be attached outside the window so that the capturing can be performed from a side of the apparatus through the window.

Figure 4:
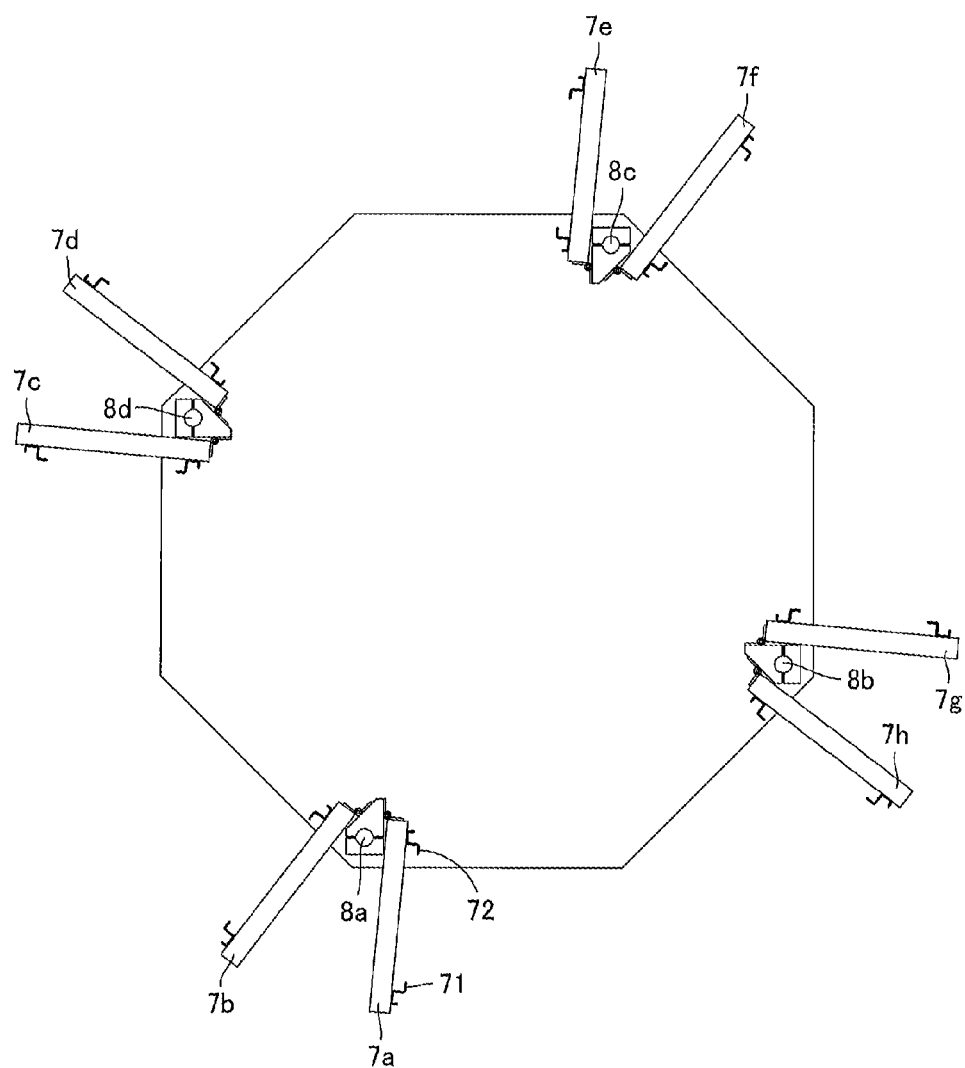
FIG. 4 is a top view showing a state in which doors in the image capturing apparatus are opened.

FIG. 4 is a schematic view showing a state in which all the doors 7a to 7h are opened and viewed from a top of the apparatus. As shown in FIG. 4, the doors 7a and 7b are attached to the column 8a. The doors 7c and 7d are attached to the column 8d. The doors 7e and 7f are attached to the column 8c. The doors 7g and 7h are attached to the column 8b. The doors 7a to 7h are attached to the columns 8a to 8d by hinges. As shown in FIG. 4, the doors 7a to 7h open outward by about 90 degrees about the columns 8a to 8d.

As shown in FIGS. 1 and 3, the top plate 2 has a wide central opening, and beam-shaped members 3a and 3b are crossed across the opening. Ends of the beam-shaped members 3a and 3b are fixed to the columns 8a to 8d.

Two hanging members 5a and 5b which extend vertically downward are fixed to the beam-shaped member 3a. An upper lighting plate 4 is supported by the hanging members 5a and 5b. Outer shape of the upper lighting plate 4 is a regular octagon similar to the bottom plate 1. The upper lighting plate 4 can be moved in the vertical direction in order to adjust distance from the turntable 11. For example, as shown in FIG. 2, the upper lighting plate 4 can be moved to position indicated by reference numeral 4'. In this way, the upper lighting plate 4 has a size that does not interfere with the doors 7a to 7f when moving up and down.

As shown in FIGS. 2 and 3, stoppers 5c and 5d are provided at roots of the hanging members 5a and 5b on the top plate 2. By loosening the stoppers 5c and 5d, length of the hanging members 5a and 5b protruding below the top plate 2 can be adjusted. Thereby, height position of the upper lighting plate 4 with respect to the turntable 11 can be adjusted. After setting the upper lighting plate 4 at appropriate height position, the stoppers 5c and 5d are moved to fastening positions to fix the height of the upper lighting plate 4. In this example, the height of the upper lighting plate 4 with respect to the turntable 11 is manually set, but the height of the upper lighting plate 4 with respect to the turntable 11 may be automatically controlled by motor control or the like.

As will be described in detail later, a large number of LED light sources are arranged on the entire lower surface of the upper lighting plate 4. As shown in FIGS. 1 and 3, the upper lighting plate 4 is provided with an opening 4a at position overlapping with the beam-shaped member 3b when viewed from a top view. The opening 4a is formed so as to receive objective lenses of a first camera 6a and a second camera 6b. Accordingly, the subject to be captured on the turntable 11 can be captured by the first camera 6a and second camera 6b through the opening 4a.

Next, the configuration of the lighting provided in the image capturing apparatus 100 will be described with reference to FIGS. 5 to 8.

First, the lighting unit provided on inner surfaces of the doors 7a to 7h will be described.

Figure 5:
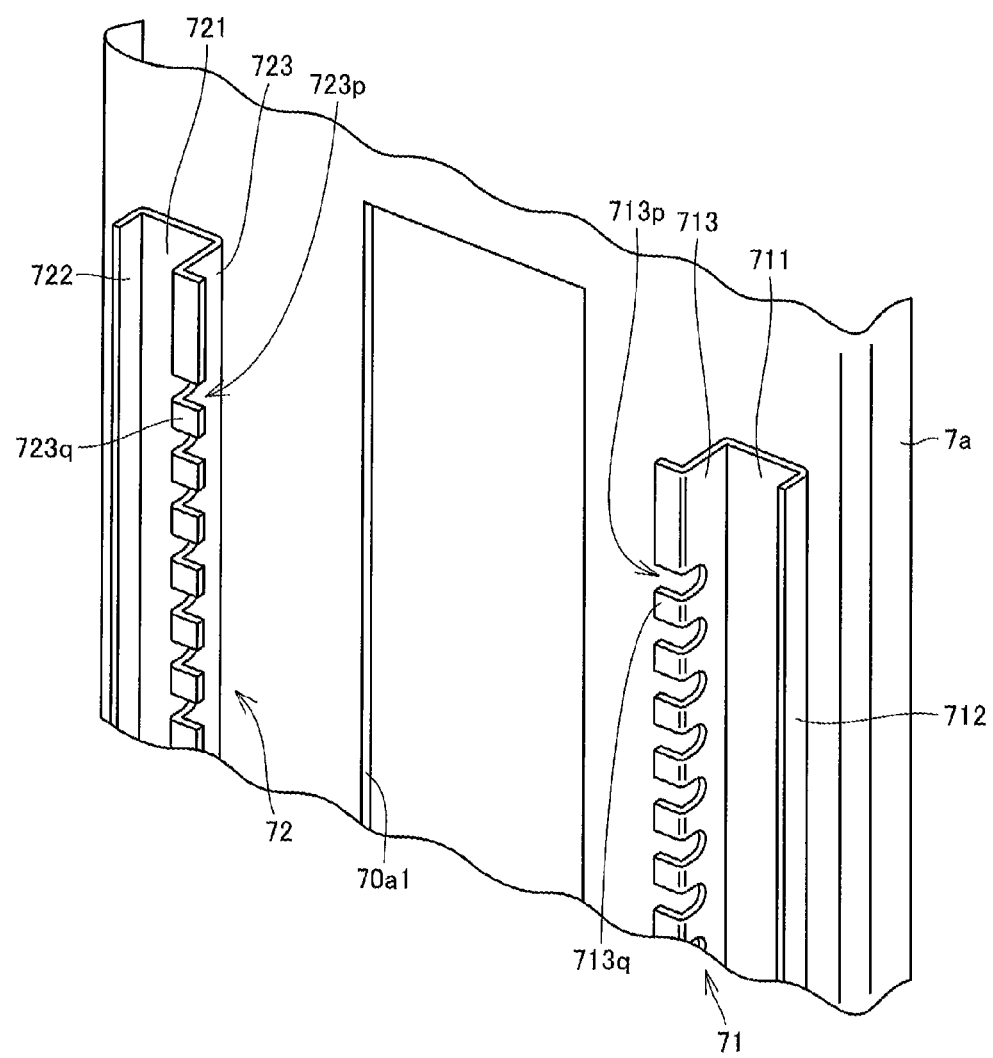
FIG. 5 is a perspective view showing a configuration of an inner surface of the door of the image capturing apparatus.

Although FIG. 5 illustrates only the door 7a, the doors 7a to 7h have a common configuration for racks 71 and 72. Therefore, only the door 7a will be described here, but the doors 7b to 7h also have the same configuration.

As shown in FIG. 5, the door 7a is provided with the racks 71 and 72 for supporting the lighting unit described later. The racks 71 and 72 are provided continuously on the inner surface of the door 7a in the vertical direction and on the left and right of the windows 70a1 and 70a2.

The rack 71 includes a fixing surface 711, an outer side surface 712, and an inner side surface 713. The fixing surface 711 is fixed to the inner surface of the door 7a. The outer side surface 712 is provided on an end portion side of the rack 71 in the width direction of the door 7a and projects from the inner surface of the door 7a. The inner side surface 713 faces the outer side surface 712 and includes concave portions 713p and convex portions 713q. The concave portions 713p and convex portions 713q are provided alternately along a length direction of the rack 71.

The rack 72 includes a fixing surface 721, an outer side surface 722, and an inner side surface 723. The fixing surface 721 is fixed to the inner surface of the door 7a. The outer side surface 722 is provided on an end portion side of the rack 72 in the width direction of the door 7a and projects from the inner surface of the door 7a. The inner side surface 723 faces the outer side surface 722 and includes concave portions 723p and convex portions 723q. The concave portions 723p and convex portions 723q are provided alternately along a length direction of the rack 72.

Figure 6:
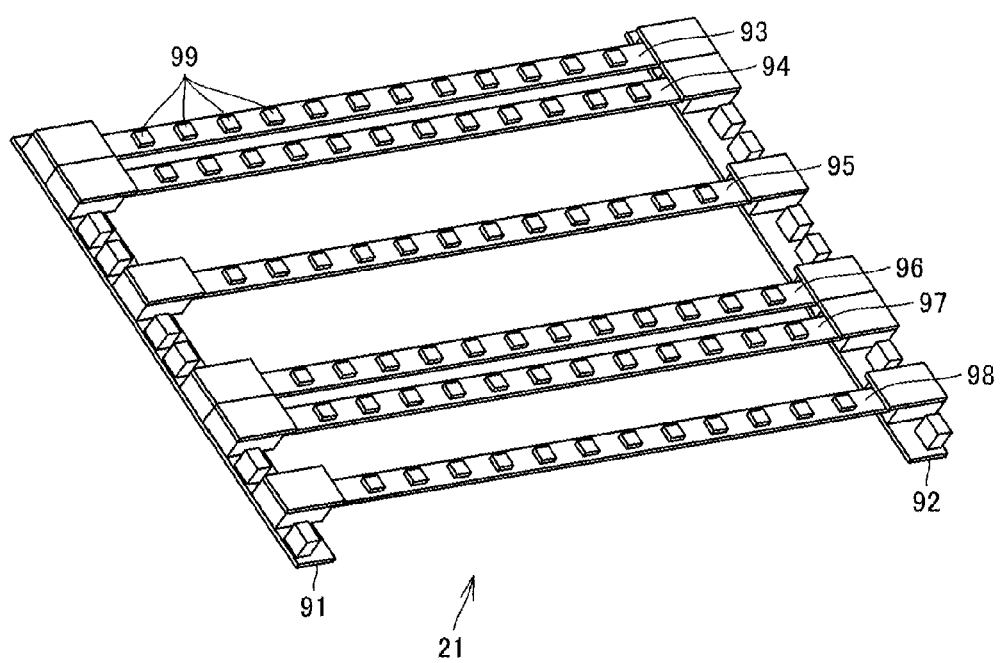
FIG. 6 is a perspective view showing a configuration of a lighting unit attached to the inner surface of the door of the image capturing apparatus.

FIG. 6 is a perspective view showing a schematic configuration of the lighting unit 21 to be attached to the racks 71 and 72. The lighting unit 21 has a configuration in which a plurality of LED substrates 93 to 98 are connected in parallel to each other between wiring substrates 91 and 92 arranged in parallel to each other. Although only six LED substrates are shown in the example of FIG. 6, the number of LED substrates is not limited thereto.

A plurality of LED light emitting elements 99 are arranged on each of the LED substrates 93 to 98. A control circuit or the like for controlling ON/OFF of each of the LED light emitting elements 99 can be arbitrarily arranged on the wiring substrates 91 and 92. In the present embodiment, the plurality of LED light emitting elements 99 mounted on the LED substrates 93 to 98 are simultaneously ON/OFF-controlled for each door. However, it is also possible to independently control ON/OFF of each LED light emitting element 99. For example, the LED light emitting elements 99 may be turned on only in a part of the LED substrates 93 to 98. Furthermore, the plurality of LED light emitting elements may be sequentially turned on one LED substrate.

In the example of FIG. 6, the LED substrates 93 and 94 are arranged adjacent to each other, the LED substrate 95 is arranged next to the above LED substrate at intervals of two LED substrates, the LED substrates 96 and 97 are arranged next to the above LED substrate at intervals of two LED substrates, and the LED substrate 98 is arranged next to the above LED substrate at intervals of one LED substrate. However, an arrangement pattern of the LED substrates is not limited to this example, and arrangement intervals and the like of the LED substrates can be arbitrarily adjusted in order to obtain a desired lighting effect.

Widths of the wiring substrates 91 and 92 are slightly smaller than widths of the fixing surfaces 711 and 721 of the racks 71 and 72. The intervals and widths of the LED substrates 93 to 98 are set such that the LED substrates 93 to 98 can be received in the recesses 713p and 723p of the racks 71 and 72. Lengths of the LED substrates 93 to 98 are set such that the wiring substrate 91 is arranged along the fixing surface 721 of the rack 72 and between the outer side surface 722 and the inner side surface 723, and at the same time, the wiring substrate 92 is arranged along the fixing surface 711 of the rack 71 and between the outer side surface 712 and the inner side surface 713. Accordingly, the lighting unit 21 can be attached to the racks 71 and 72 so that the LED light emitting elements 99 face inward. Another wiring substrate or the like may be appropriately installed between the wiring substrates 91 and 92 and the fixing surfaces 711 and 721.

The lighting unit 21 is fixed to the fixing surfaces 711 and 721 of the racks 71 and 72 with screws or the like but these can be easily removed when the lighting condition is changed.

Alternatively, the lighting condition can be changed without removing the lighting unit 21 by arranging the LED substrates at equal intervals in the recesses 713p and 723p of the racks 71 and 72 and turning on only necessary rows (LED substrates) according to a desired lighting condition.

Figure 7:
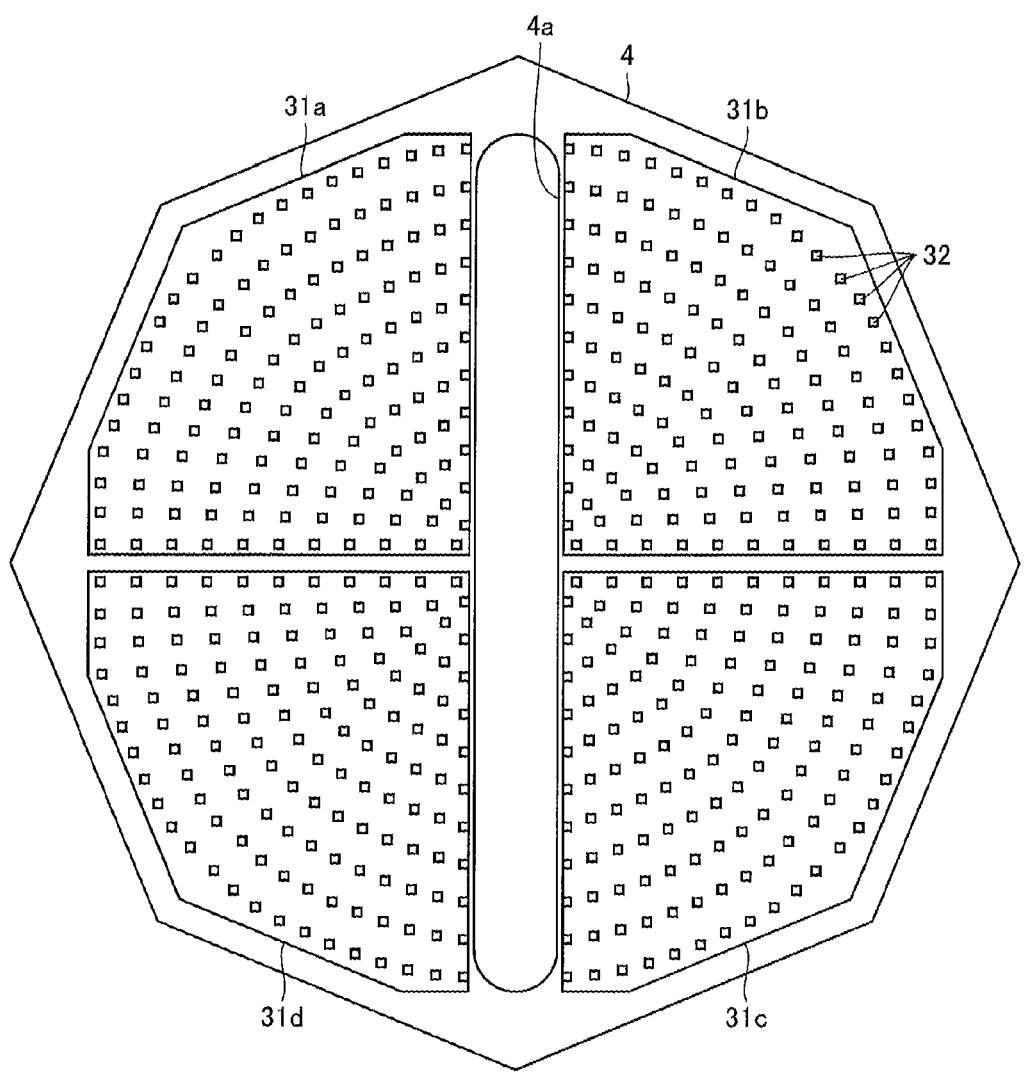
FIG. 7 is a plan view showing a schematic configuration of the lighting units installed on a lower surface of an upper lighting plate.

As shown in FIG. 7, in the configuration of the present embodiment, since the doors 7a to 7h open widely outward, it is possible to easily attach and detach the lighting unit 21 to and from the racks 71 and 72 provided on the inner surface of each of the doors 7a to 7h.

Figure 8:
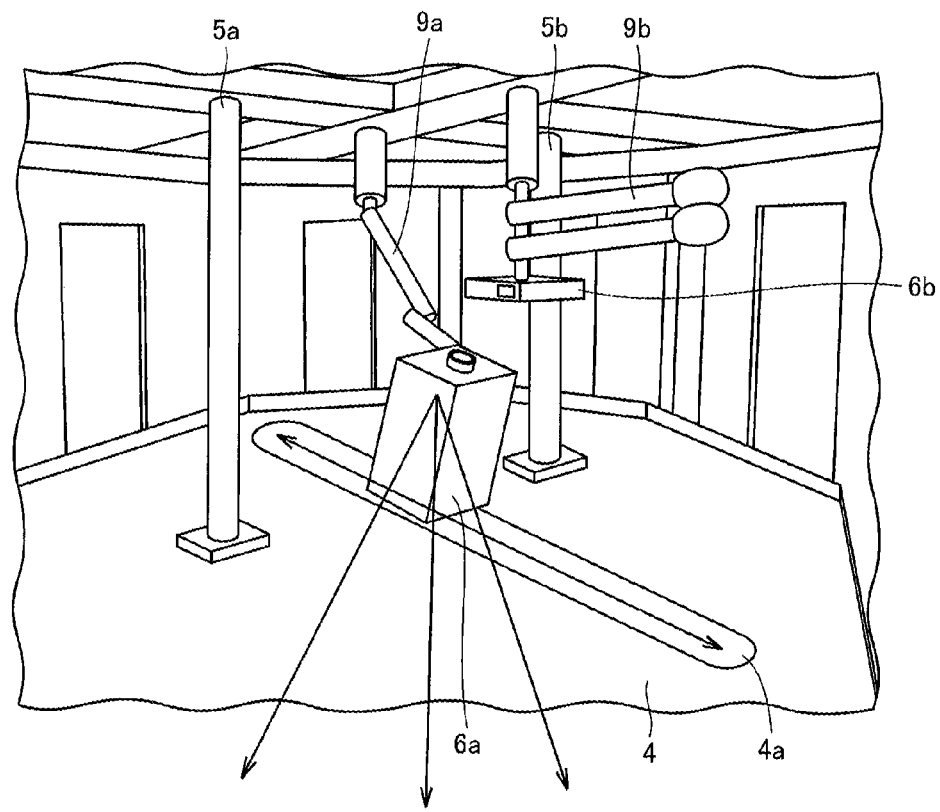
FIG. 8 is a schematic diagram showing the arrangement of cameras in the image capturing apparatus according to the embodiment.

Next, the configuration of the lighting unit provided on the lower surface of the upper lighting plate 4 will be described with reference to FIGS. 7 and 8. FIG. 7 is a plan view showing a schematic configuration of the lighting unit installed on the lower surface of the upper lighting plate 4. As shown in FIG. 7, lighting units 31a to 31d are attached to the lower surface of the upper lighting plate 4. Each of the lighting units 31a to 31d has a structure in which the plurality of LED light emitting elements 32 are attached to an LED substrate.

In the present embodiment, the plurality of LED light emitting elements 32 attached to each of the lighting units 31a to 31d are simultaneously ON/OFF-controlled. However, it is possible to control ON/OFF of the plurality of LED light emitting elements 32 attached to each of the lighting units 31a to 31d in various orders by adjusting wiring methods and controls.

Next, an ON/OFF pattern of the lighting unit 21 attached to the doors 7a to 7h will be described. The lighting units 21 of the doors 7a to 7h are referred to as lighting units 21a to 21h, respectively. Hereinafter, each of the lighting units 21a to 21h emits white light under lighting state.

Figure 9A:
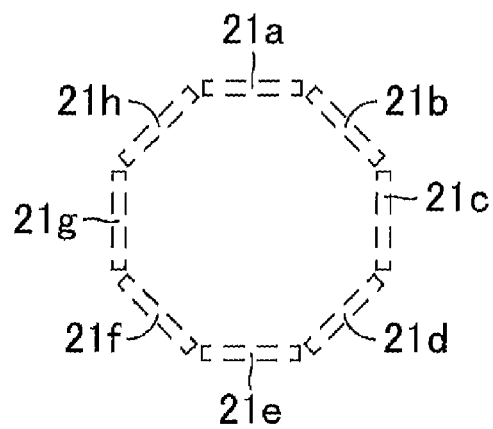
FIG. 9A is a schematic diagram showing an example of an illumination state of the lighting units on the inner surfaces of the doors.
Figure 9B:
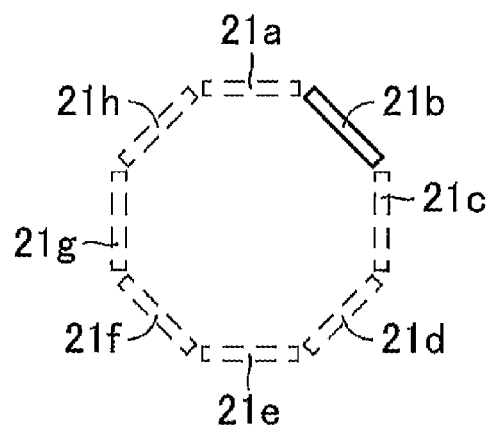
FIG. 9B is a schematic diagram showing an example of an illumination state of the lighting units on the inner surfaces of the doors.
Figure 9C:
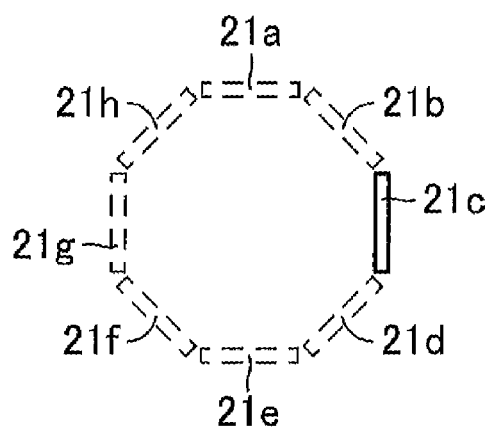
FIG. 9C is a schematic diagram showing an example of an illumination state of the lighting units on the inner surfaces of the doors.
Figure 9D:
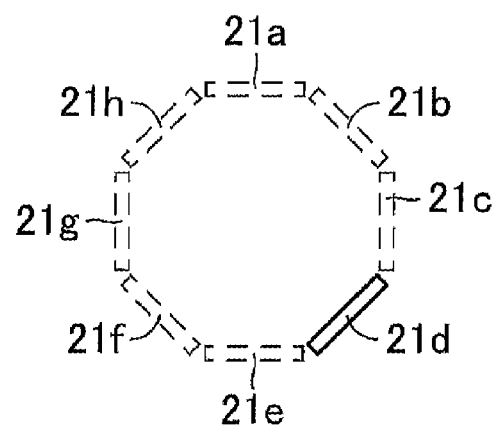
FIG. 9D is a schematic diagram showing an example of an illumination state of the lighting units on the inner surfaces of the doors.
Figure 9E:
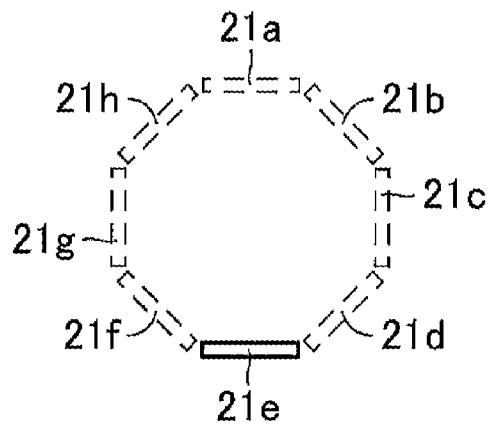
FIG. 9E is a schematic diagram showing an example of an illumination state of the lighting units on the inner surfaces of the doors.
Figure 9F:
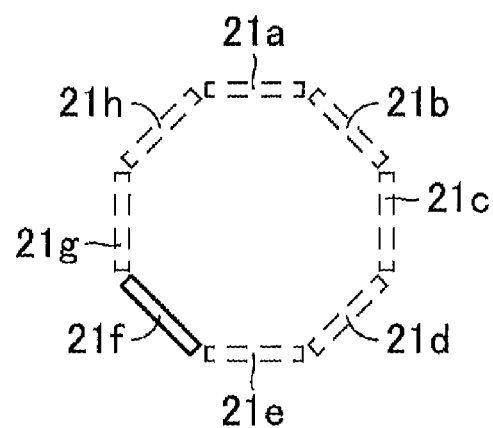
FIG. 9F is a schematic diagram showing an example of an illumination state of the lighting units on the inner surfaces of the doors.
Figure 9G:
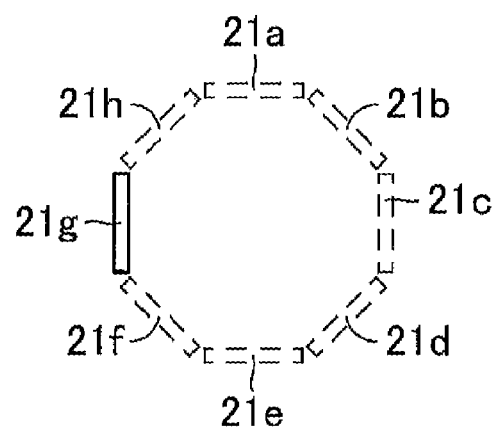
FIG. 9G is a schematic diagram showing an example of an illumination state of the lighting units on the inner surfaces of the doors.
Figure 9H:
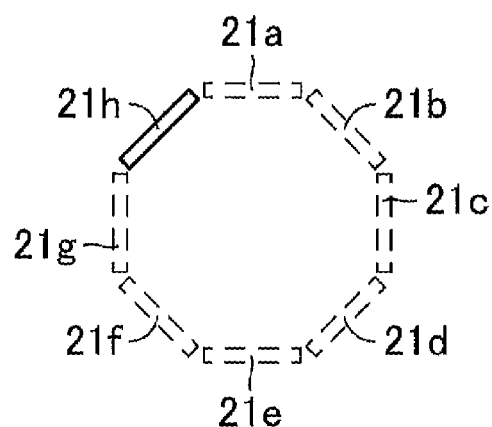
FIG. 9H is a schematic diagram showing an example of an illumination state of the lighting units on the inner surfaces of the doors.
Figure 9I:
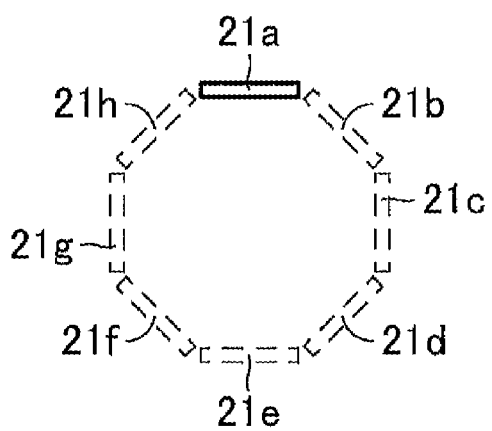
FIG. 9I is a schematic diagram showing an example of an illumination state of the lighting units on the inner surfaces of the doors.

Regarding the lighting units 21a to 21h, it is possible to select any one of nine types of illumination states: a state in which all the lighting units 21a to 21h are turned off (OFF) (FIG. 9A); a state in which only the lighting unit 21b is turned on (ON) (FIG. 9B); a state in which only the lighting unit 21c is turned on (ON) (FIG. 9C); a state in which only the lighting unit 21d is turned on (ON) (FIG. 9D); a state in which only the lighting unit 21e is turned on (ON) (FIG. 9E); a state in which only the lighting unit 21f is turned on (ON) (FIG. 9F); a state in which only the lighting unit 21g is turned on (ON) (FIG. 9G); a state in which only the lighting unit 21h is turned on (ON) (FIG. 9H); and a state in which only the lighting unit 21a is turned on (ON) (FIG. 9I). In FIGS. 9A to 9I, the lighting unit under alighting state is shown by a solid line and the lighting unit under an unlit state is shown by a broken line.

Figure 10A:
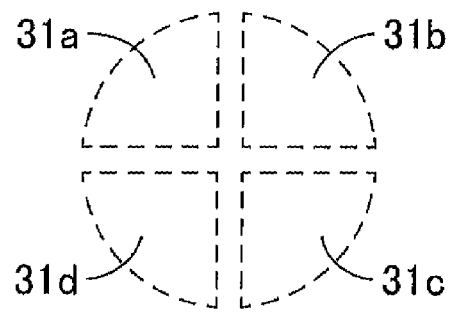
FIG. 10A is a schematic diagram showing an example of an illumination state of the lighting units of the upper lighting plate.
Figure 10B:
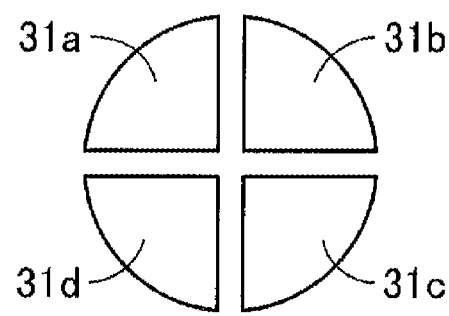
FIG. 10B is a schematic diagram showing an example of an illumination state of the lighting units of the upper lighting plate.
Figure 10C:
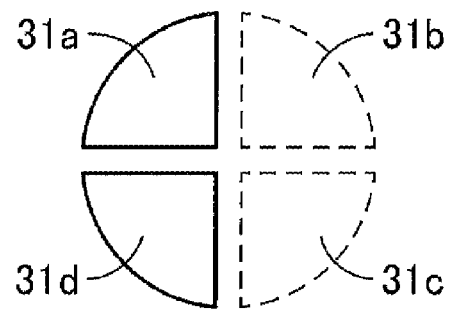
FIG. 10C is a schematic diagram showing an example of an illumination state of the lighting units of the upper lighting plate.
Figure 10D:
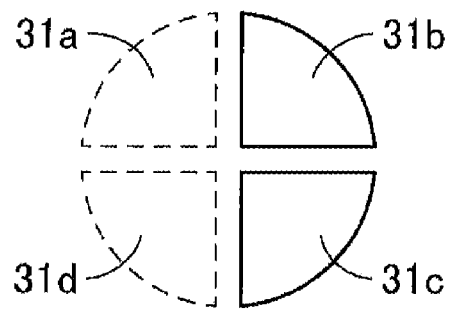
FIG. 10D is a schematic diagram showing an example of an illumination state of the lighting units of the upper lighting plate.
Figure 10E:
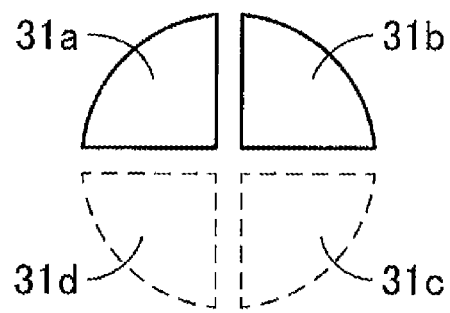
FIG. 10E is a schematic diagram showing an example of an illumination state of the lighting units of the upper lighting plate.
Figure 10F:
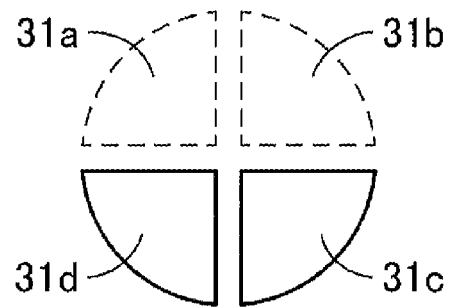
FIG. 10F is a schematic diagram showing an example of an illumination state of the lighting units of the upper lighting plate.
Figure 10G:
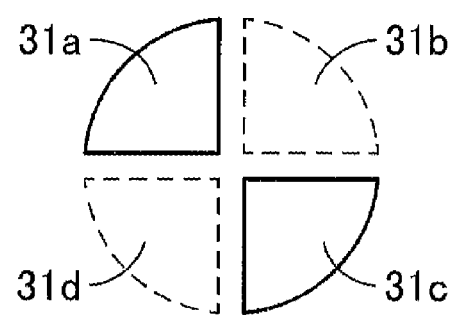
FIG. 10G is a schematic diagram showing an example of an illumination state of the lighting units of the upper lighting plate.
Figure 10H:
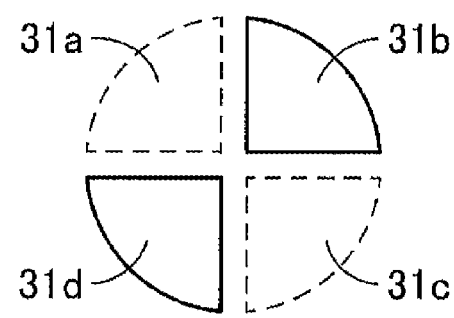
FIG. 10H is a schematic diagram showing an example of an illumination state of the lighting units of the upper lighting plate.

Next, an ON/OFF pattern of the lighting units 31a to 31d of the upper lighting plate 4 will be described. Also, in FIGS. 10A to 10H, the lighting units under a lighting state are shown by the solid line, and the lighting units under an unlit state are shown by the broken line. Hereinafter, each of the lighting units 31a to 31d emits white light under the lighting state. Regarding the lighting units 31a to 31d, it is possible to select anyone of eight types of illumination states: a state in which all of the lighting units 31a to 31d are turned off (OFF) (FIG. 10A); a state in which all of the lighting units 31a to 31d are turned on (ON) (FIG. 10B); a state in which the lighting units 31a and 31d are turned on and the lighting units 31b and 31c are turned off (FIG. 10C); a state in which the lighting units 31a and 31d are turned off, and the lighting units 31b and 31c are turned on (FIG. 10D); a state in which the lighting units 31a and 31b are turned on and the lighting units 31c and 31d are turned off (FIG. 10E); a state in which the lighting units 31a and 31b are turned off and the lighting units 31c and 31d are turned on (FIG. 10F); a state in which the lighting units 31*a* and 31*c* are turned on and the lighting units 31*b* and 31*d* are turned off (FIG. 10G); and a state in which the lighting units 31*a* and 31*c* are turned off, and the lighting units 31*b* and 31*d* are turned on (FIG. 10H).

Therefore, it is possible to realize a total of 72 illumination states by combining the 9 patterns of the lighting units 21*a* to 21*h* of the doors 7*a* to 7*h* and the 8 patterns of the lighting units 31*a* to 31*d* of the upper lighting plate 4.

In this embodiment, all the LED light emitting elements are simultaneously ON/OFF-controlled in each of the lighting units 21*a* to 21*h* of the doors 7*a* to 7*h*. Furthermore, all the LED light emitting elements are simultaneously ON/OFF-controlled in each of the lighting units 31*a* to 31*d* of the upper lighting plate 4. However, as described above, it is possible to realize various variations of the illumination states by varying ON/OFF timing of the LED light emitting elements in various ways.

For example, in each of the lighting units 21*a* to 21*h*, the LED substrates 93 to 98 (see FIG. 6) may emit light row by row. Furthermore, an order in which the LED substrates 93 to 98 emit light can beset arbitrarily. For example, the LED light emitting elements on the LED substrates 93 to 98 may sequentially emit light one row at a time from the top (or from the bottom) or may emit light in other predetermined order or random order. In addition, the light may be emitted in a plurality of rows at the same time, instead of one row at a time.

Furthermore, the plurality of LED light emitting elements on each of the LED substrates 93 to 98 may emit light one by one. In addition, an order in which the plurality of LED light emitting elements on one LED substrate emit light can be set arbitrarily. For example, the plurality of LED light emitting elements arranged on one LED substrate may sequentially emit light one by one from the end or may emit light in other predetermined order or random order. Also, the plurality of LED light emitting elements may emit light at the same time instead of one by one.

Also, in order to make an average image brightness uniform, the brightness of a large number of LED light emitting elements mounted on the lighting units 21*a* to 21*h* of the doors 7*a* to 7*h* and the lighting units 31*a* to 31*d* of the upper lighting plate 4 may be adjusted depending on the position and number of LED light emitting elements that emit light.

Alternatively, contrary to the above, the brightness of a large number of LED light emitting elements mounted on the lighting units 21*a* to 21*h* of the doors 7*a* to 7*h* and the lighting units 31*a* to 31*d* of the upper lighting plate 4 may be adjusted to make the brightness image different, depending on the position and number of LED light emitting elements that emit light.

Next, an arrangement of the first camera 6*a* and the second camera 6*b* will be described. As shown in FIG. 8, the first camera 6*a* is supported by an arm 9*a* extending from the beam-shaped member 3*b* in a state in which the first camera 6*a* can be moved in parallel along the longitudinal direction of the opening 4*a* of the upper lighting plate 4. The arm 9*a* can also change an angle of the first camera 6*a* with respect to the normal line of the upper lighting plate 4. The second camera 6*b* is supported by an arm 9*b* extending from the beam-shaped member 3*b*. Similarly to the first camera 6*a*, the second camera 6*b* can be moved in parallel along the longitudinal direction of the opening 4*a*, and an angle with respect to the normal line of the upper lighting plate 4 can be changed.

In this way, a large number of images can be captured in a short time by using multiple cameras and capturing the images from different positions and with different angles to each other.

Furthermore, capturing conditions may be different between the first camera 6*a* and the second camera 6*b*.

Although some embodiments of the present invention have been described above, the embodiments of the present invention are not limited to the above specific examples, and various modifications can be made.

For example, in the above embodiment, the configuration in which the turntable 11 is provided on the bottom plate 1 is illustrated. However, the turntable 11 may be omitted and the subject to be captured may be mounted on the bottom plate 1 (or a placement stand that does not rotate).

In the above-described embodiment, it is illustrated that the configuration in which eight doors are provided around the bottom plate 1 and the lighting unit is attached to the inner surface of each door. However, the number of doors is not limited thereto. Moreover, it is not essential to attach the lighting unit to all the doors.

Furthermore, in the above embodiment, it is illustrated that the configuration in which both the lighting unit 31 attached to the upper lighting plate 4 and the lighting unit 21 attached to the door 7 located on the side of the apparatus can be used to make the lighting conditions from both the upper lighting plate and the side of the apparatus different. However, the lighting unit may be provided on only one of the upper lighting plate and the side of the apparatus.

In the above-described embodiment, the lighting units 21 and 31 emit white light when turned on. However, since a LED light emitting element can emit various color lights, it is possible to further increase the variation of the lighting conditions by changing the colors of emitted light. For example, in order to simulate a color temperature of the lighting, emission color of the LED light emitting elements that emits light among the LED light emitting elements attached to the lighting units 21*a* to 21*h* of the doors 7*a* to 7*h* and the lighting units 31*a* to 31*d* of the upper lighting plate 4 may be adjusted depending on a desired color temperature. Furthermore, by varying intensity of the light emitted from the LED light emitting element, the variation of the lighting condition may be further increased. Moreover, the intensity of the emitted light may be adjusted according to the number of LED light emitting elements to emit light so that the brightness of the image is almost uniform.

In addition, in the above embodiment, it is illustrated that the configuration in which all of the eight doors open outward. However, it is not necessary to open all doors.

EXPLANATION OF SYMBOLS

1 . . . Bottom plate, 2 . . . Top plate, 3*a*/3*b* . . . Beam-shaped member, 4 . . . Upper lighting plate, 4*a* . . . Lighting plate opening, 5*a*/5*b* . . . Hanging member, 6*a* . . . First camera, 6*b* . . . Second camera, 7*a*-7*f* . . . Door, 8*a*-8*d* . . . Column, 11 . . . Turntable, 12 . . . Cloth, 13 . . . Cloth fixing ring, 21 . . . Lighting unit, 31 . . . Lighting unit. 32 . . . LED light emitting element, 91/92 . . . Wiring substrate, 93 . . . 98 . . . LED substrate, 99 . . . LED light emitting element, 100 . . . Image capturing apparatus

We claim:

1. An image capturing apparatus comprising:
   a placement stand for placing a subject to be captured;
   at least one camera for capturing an image of the subject placed on the placement stand;

a plurality of side walls provided to surround the placement stand;

a plurality of lateral lighting units installed on the inner surface of the plurality of side walls, and an upper lighting plate having a plurality of upper lighting units above the placement stand, wherein a plurality of images of the same object are captured by the at least one camera under a plurality of lighting states while a lighting condition of the placement stand is varied by individually changing lighting states of the plurality of lateral lighting units so as to be capable of capturing the images of the subject with different light incident directions, the at least one camera is arranged so as to face the placement stand through an opening of the upper lighting plate, and the opening of the upper lighting plate is partially or completely open, and the plurality of images are used for learning data when creating AI.

2. The image capturing apparatus of claim 1, wherein at least one of the side walls can be opened and closed.

3. The image capturing apparatus of claim 1, wherein the lighting condition of the placement stand are changed by varying lighting states of the plurality of upper lighting units individually.

4. The image capturing apparatus of claim 3, wherein the upper lighting plate is movable up and down.

5. The image capturing apparatus of claim 1, wherein the at least one camera is movable along the opening.

6. The image capturing apparatus of claim 1, wherein an angle of the at least one camera can be changed with respect to a normal line of the upper lighting plate.

7. The image capturing apparatus of claim 1, wherein the at least one camera includes two or more cameras.

8. The image capturing apparatus of claim 1, wherein the lighting unit includes wiring substrates arranged in parallel and a light emitting element substrate connected between the wiring substrates, and the side wall has a rack supporting the lateral lighting unit.

9. The image capturing apparatus of claim 1, wherein each of the plurality of lateral lighting units includes a plurality of LED light emitting elements, and the lighting condition of the placement stand are changed by changing at least one of position, number, emission order, emission light intensity, and emission light color of the LED light emitting elements that emit light among the plurality of LED light emitting elements.

10. The image capturing apparatus of claim 3, wherein each of the plurality of upper lighting units includes a plurality of LED light emitting elements, and the lighting condition of the placement stand are changed by changing at least one of position, number, emission order, emission light intensity, and emission light color of the LED light emitting elements that emit light among the plurality of LED light emitting elements.

11. The image capturing apparatus of claim 1, wherein the placement stand includes a turntable.

12. The image capturing apparatus of claim 2, wherein the lighting condition of the placement stand are changed by varying lighting states of the plurality of upper lighting units individually.

13. The image capturing apparatus of claim 5, wherein an angle of the at least one camera can be changed with respect to a normal line of the upper lighting plate.

14. The image capturing apparatus of claim 2, wherein the at least one camera includes two or more cameras.

15. The image capturing apparatus of claim 3, wherein the at least one camera includes two or more cameras.

16. The image capturing apparatus of claim 4, wherein the at least one camera includes two or more cameras.

17. The image capturing apparatus of claim 1, wherein the at least one camera includes two or more cameras.

18. The image capturing apparatus of claim 5, wherein the at least one camera includes two or more cameras.

* * * * *